United States Patent [19]

Artzberger et al.

[11] 4,014,059
[45] Mar. 29, 1977

[54] FRAME CONSTRUCTION FOR A DOCKBOARD

[75] Inventors: Thomas G. Artzberger, Menomonee Falls; Thomas J. Wiener, Brown Deer, both of Wis.

[73] Assignee: Kelley Company, Inc., Milwaukee, Wis.

[22] Filed: July 28, 1975

[21] Appl. No.: 599,891

[52] U.S. Cl. .............................................. 14/71.3
[51] Int. Cl.² ........................................ E01D 1/00
[58] Field of Search ............... 14/71 R, 71 M, 72 R

[56] References Cited

UNITED STATES PATENTS

| 3,271,801 | 9/1966 | Dieter | 14/71 M |
| 3,308,497 | 3/1967 | Lambert | 14/71 M |
| 3,528,118 | 9/1970 | Smith | 14/71 M |
| 3,699,601 | 10/1972 | Hecker | 14/71 M |
| 3,886,615 | 6/1975 | Metro | 14/71 M |

*Primary Examiner*—Nile C. Byers
*Attorney, Agent, or Firm*—Andrus, Sceales, Starke & Sawall

[57] ABSTRACT

A frame construction for an adjustable, pit mounted dockboard. The frame includes a rear frame section and a front frame section which are connected solely by a tubular housing that contains a spring for the ramp counterbalancing assembly. Leveling members are adjustably mounted for free vertical movement on the base member of each frame section, and after levelling of the frame in the pit, the leveling members are welded to the frame sections to support the frame in the leveled condition.

8 Claims, 7 Drawing Figures

FRAME CONSTRUCTION FOR A DOCKBOARD

BACKGROUND OF THE INVENTION

An adjustable dockboard as disclosed in U.S. Pat. Nos. 3,203,002 and 3,528,118 includes a frame or supporting structure that is mounted in a shallow pit or depression in the loading dock. The conventional frame has a rear frame section and a forward frame section that are connected together by a series of stringers that extend in a fore and aft direction.

In the dockboard of the type described in the aforementioned patents, a ramp is hinged to the rear frame section and is adapted to be biased upwardly to an inclined position by a counterbalancing spring assembly. As disclosed in U.S. Pat. No. 3,528,118, the counterbalancing spring assembly includes a coil spring mounted within a tubular housing that extends in a fore and aft direction of the dockboard and the spring is connected to a lever arm secured to the rear edge of the ramp. The force of the spring, if unrestrained, serves to bias the ramp to an upwardly inclined position.

The ramp, when in the horizontal cross traffic position, should be flush with the upper surface of the dock so that the ramp will not interfere with the movement of traffic on the dock. When installing the dockboard in the pit in the loading dock, the dockboard is lowered by a hoist into the pit and the dockboard is shimmed to a level condition, in which the ramp is flush with the dock surface, by manually inserting shims under the frame. After leveling the dockboard, the shims are welded to the frame to support the dockboard in the level condition. The selection and positioning of the shims to level the dockboard in the pit is a difficult and time consuming operation.

SUMMARY OF THE INVENTION

The invention relates to an improved frame construction for an adjustable, pit-mounted dockboard. The frame includes a rear frame section and a front frame section which are connected solely by a tubular housing that houses a spring for the ramp counterbalancing assembly. The use of the tubular housing as the sole connecting structural member between the front and rear frame sections provides a more effective structural connection and eliminates the need for the stringers that have been employed in conventional dockboard construction. By eliminating the stringers, the weight and overall cost of the dockboard is reduced.

The invention also includes a leveling mechanism in which leveling members are mounted for free vertical movement on the base members of each frame section. As the dockboard is lowered into the pit, each leveling member will engage the bottom of the pit and float upwardly relative to the base member. When the dockboard is properly leveled, the leveling members are then welded to the frame to thereby support the frame in the level condition.

The leveling construction acts as an adjustable shim mechanism and eliminates the task of manually positioning shims at various locations under the frame sections, as well as the trial and error selection of proper shim thickness to achieve the level condition for the dockboard. Thus, the use of the leveling arrangement of the invention substantially reduces the installation time of the dockboard.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
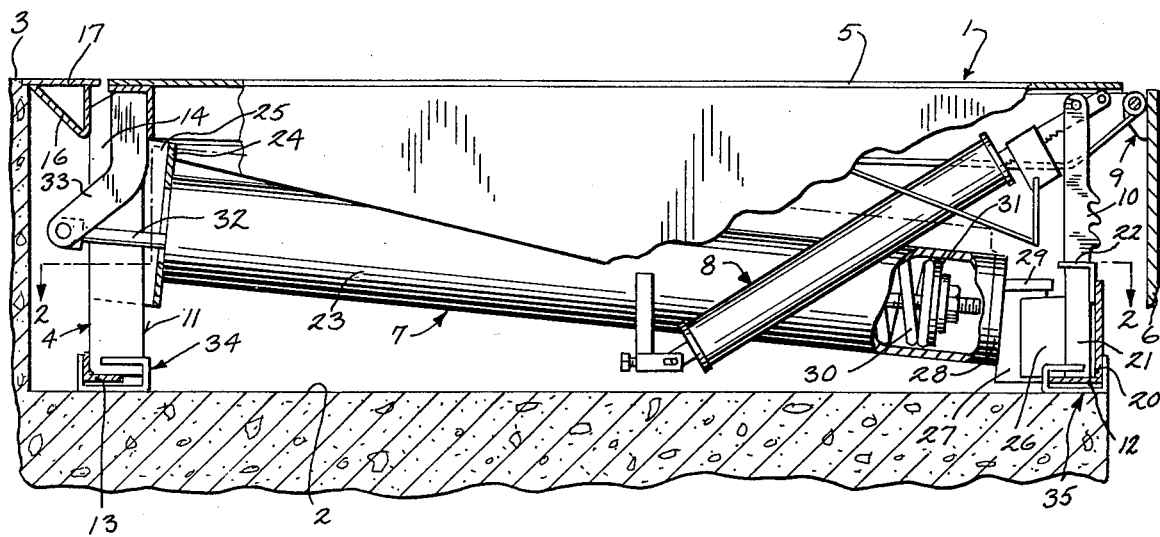
FIG. 1 is a side elevation of a dockboard incorporating the frame construction of the invention.
Figure 2:
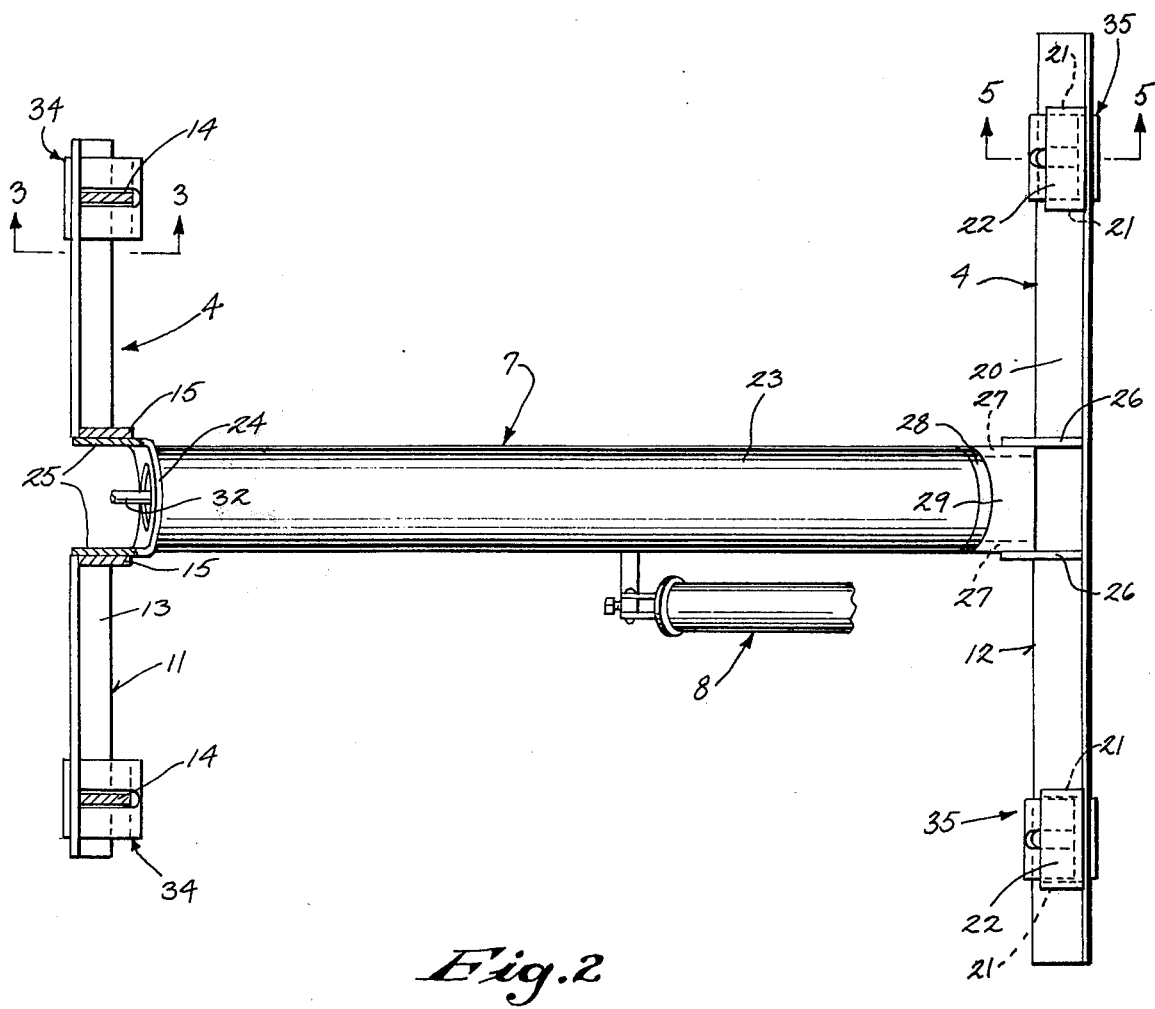
FIG. 2 is a top view of the dockboard frame.

The drawings illustrate an adjustable dockboard 1 which is mounted in a shallow pit or depression 2 in a loading dock 3 and is adapted to span the gap between the dock 3 and a truck or other carrier located in front of the dock.

The dockboard 1 is similar to that shown in the U.S. Pat. No. 3,528,118, and includes a frame 4 or supporting structure and a ramp 5 is hinged at its rear edge to the frame. Hinged to the front edge of the ramp 5 is a lip 6 which is movable from a downwardly hanging pendant position to an extended position where the lip forms an extension to the ramp. Engagement of the rear edge of the lip 6 with the forward surface of the ramp 5 prevents pivotal movement of the lip beyond the fully extended position.

The ramp 5 is adapted to be biased to an upwardly inclined position by a counterbalancing spring assembly 7, similar to that disclosed in U.S. Pat. No. 3,528,118, while a releasible holddown mechanism 8, similar to that described in U.S. Pat. No. 3,646,627, extends between the frame 4 and the ramp 5. The holddown mechanism 8 permits free downward movement of the ramp, but will restrain upward movement of the ramp through the force of the counterbalancing spring assembly 7 unless manually released, as disclosed in the aforementioned patent.

The lip 6 is adapted to be pivoted to the extended position, and latched in the extended position, by a lip lifting and latching mechanism 9, similar to that described in the U.S. Pat. No. 3,203,002.

The dockboard may also include a pair of retractable notched legs 10 which are hinged to the forward edge of the ramp. The cross traffic legs 10 are similar to that disclosed in U.S. Pat. No. 3,137,017 and serve to support the ramp at either the horizontal, cross traffic position or at a series of below dock level positions.

In accordance with the invention, the frame 4 includes a rear frame section 11 and a front frame section 12. The rear frame section 11 includes a base angle 13 and a pair of outer vertical suport 14 extend upwardly from the outer ends of the base 13 while a pair of inner vertical supports 15 extend upwardly in spaced relation from the central portion of the base 13.

Figure 3:
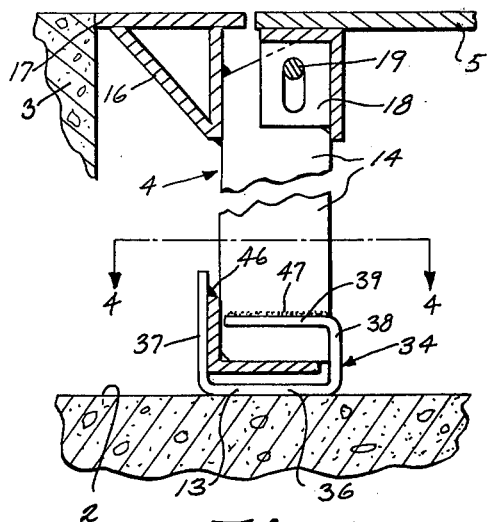
FIG. 3 is an enlarged fragmentary side elevation showing the attachment of the leveling member to the rear frame section.
Figure 5:
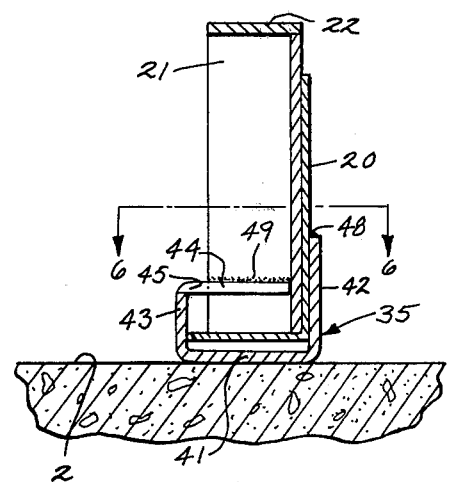
FIG. 5 is an enlarged fragmentary side elevation showing the attachment of the leveling member to the front frame section.
Figure 4:
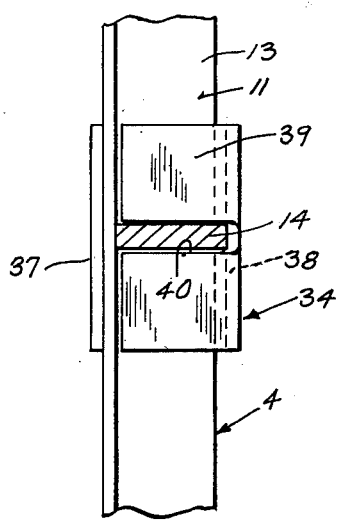
FIG. 4 is a view taken along line 4—4 of FIG. 3.
Figure 6:
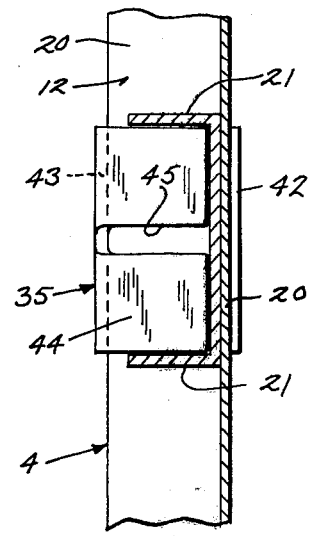
FIG. 6 is a view taken along line 6—6 of FIG. 5.
Figure 7:
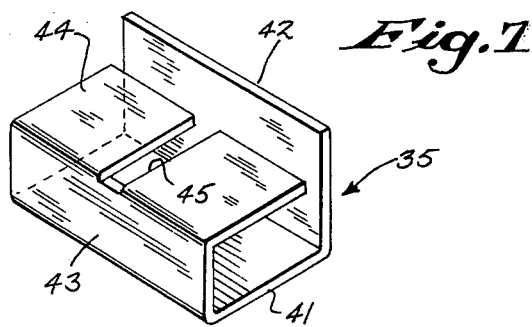
FIG. 7 is a perspective view of a leveling member.

As shown in FIG. 3, the vertical leg of a generally V-shaped horizontal support member 16 is welded to the rear edges of the vertical supports 14 and 15, and a horizontal plate 17 is secured to the upper edges of the V-shaped support 16. The plate 17 is adapted to be mounted flush with the upper surface of the loading dock.

The supports 14 and 15 serve as a portion of the hinge connection between the ramp 5 and the rear frame section 11. The rear edge of the ramp carries a series of lugs 18 which are pivotally connected to the upper ends of the supports 14 and 15 by hinge pins 19. With this connection, the ramp 5 can be pivoted upwardly by spring assembly 7 with respect to the rear frame section.

The front frame section 12 includes an angle shaped base member 20 and a pair of U-shaped supports 21 extend upwardly from the ends of the base 20. Horizontal plates 22 are secured to the upper edges of the supports 21 and function as a support or abutment for the cross traffic legs 10. The lower ends of the legs 10 will engage the plates 22 to support the ramp at the horizontal cross traffic position, while engagement of the notches in the legs 10 with the plate 22 will support the ramp at a series of below dock level positions.

Connected between the front frame section 12 and the rear frame section 11 is a tubular housing 23 which functions as a portion of the counterbalancing spring assembly 7. The rear end of the tubular housing 23 is secured to a U-shaped support 24 and the legs of the U-shaped support are secured flatwise to the central supports 15 of the rear section 11.

The forward end of the tubular housing 23 is secured to the front frame section 12 through plates 26 and 27. Plates 26 are secured to the base 20 and in turn are connected to vertical plates 27 which are secured to the end plate 28 for the housing 23. In addition, a horizontal plate 29 is connected across the top edges of the plates 27 and can serve as a seat for a safety leg mechanism, not shown.

The counterbalancing spring assembly 7, which is similar to that described in U.S. Pat. No. 3,528,118, includes a coil spring 30 which is located within the housing 23. One end of the spring bears against the support 24, while the opposite end of the spring 29 bears against a retainer 31 which is mounted for sliding movement within the housing 23. Rod 32 is connected to the retainer and extends rearwardly within the spring 29. The rear end of the rod 32 is connected to the lower end of the lever arm 33, that is welded to the rear edge of the ramp. With this construction, the force of the spring 29 will urge the rod 32 forwardly to thereby bias the ramp 5 to an upwardly inclined position.

The tubular housing 23 provides the sole strucutral connection between the rear frame section 11 and the front frame section 12, thereby eliminating the fore-aft stringers that have been used in conventional dockboard frame constructions.

The invention also includes an automatic arrangement which facilitates leveling of the dockboard in the pit 2 of the dock 3. In this regard, a pair of leveling members of shims 34 are associated with the rear frame section and an identical pair of leveling members or shims 35 are associated with the front frame section 12.

Each shim 34 includes a bottom surface 36 that is located beneath the horizontal leg of base 13, and flanges 37 and 38 extend upwardly from the surface 36. The upper end of flange 38 is bent inwardly to provide a horizontal leg 39 that is positioned parallel to the bottom surface 36 and overlies the horizontal leg of the base 13. Formed centrally of leg 39 is a slot 40 that receives the vertical support 14 and the engagement of the vertical supports 14 with slots 40 prevents displacement of the shims 34 in a direction parallel to the long dimension of the base 13.

Shims 35 are similar in construction to shims 34, and each shim 35 includes a bottom surface 41 disposed beneath the horizontal leg of base 20, and vertical flanges 42 and 43. The upper end of flange 43 is bent inwardly to provide a horizontal leg 44 having a central slot 45. The legs 44 are positioned within the side flanges of the respective U-shaped supports 21, thereby preventing displacement of the shims 35 in a direction parallel to the long dimension of the base 20. The slot 45 performs no function when the shim is used in association with the front frame section 12.

When installing the dockboard, the dockboard is lowered in the pit 2 through use of a hoist or crane, and when the dockboard is suspended, the shims 34 at the rear frame section 11 will fall by gravity until the legs 39 of the shims engage the horizontal legs of the base 13. Similarly, the shims 35 at the front frame section 12 will fall by gravity until the legs 44 engage the horizontal legs of the base 20. As the dockboard is lowered, the shims 34 and 35 will engage the bottom of the pit 2 and the shims will be free to float upwardly and accommodate the levelling of the dockboard.

When the dockboard is properly leveled with the ramp 5 flush with the upper surface of the dock 3, the shims 34 and 35 are welded to the respective frame section. More specifically, the flanges 37 of the shims 34 at the rear frame section are welded by welds 46 to the vertical legs of the base angle 13, while the legs 39 are welded by the welds 47 to the vertical supports 14 which are located in the slots 40. Similarly, the flange 42 of the shims 35 at the front frame section are welded by welds 48 to the vertical leg of the base angle 20, while the side edges of the legs 44 are connected by welds 49 to the side flanges of the supports 21.

The dockboard of the invention includes free floating shims or leveling members which engage the bottom of the pit and float vertically with respect to the frame during leveling of the dockboard. When the dockboard is properly leveled, the shims can be welded to the frame to maintain the dockboard in the level condition.

The leveling mechanism of the invention eliminates the task of manually positioning shims under the frame and also eliminates the trial and error selection of shims of proper thickness in order to achieve a level condition for the dockboard.

While the drawings illustrate the use of the tubular spring housing 23 as the sole structural connection between the front and rear frame sections, it is contemplated that the structural connection can take other forms or shapes, such as, for example, a series of channels or angles that provide an enclosure for the coil spring as well as structurally connecting the front and rear frame sections.

Various modes of carrying out the invention are contemplated as being within the scope of the following claims particularly pointing out and distinctly claiming the subject matter which is regarded as the invention.

We claim:

1. In a dockboard construction, a frame including a rear frame section and a front frame section, a ramp hinged to the rear frame section and movable between a generally horizontal cross traffic position and an upwardly inclined position, said rear frame section including a base member and a plurality of vertical supports extending upwardly from said base member, said ramp being hinged to said vertical supports, said rear frame section also including a horizontal plate connected to the upper end portions of said vertical supports and extending rearwardly of said supports, said horizontal plate adapted to be mounted substantially flush with the upper surface of the dock, said rear frame section also including a generally V-shaped support having a vertical leg and a diagonal leg, said vertical leg being attached to the upper end portions of said vertical supports and said diagonal leg being secured to the underside of said horizontal plate.

2. A frame construction for a dockboard, comprising a rear frame section adapted to be mounted in a pit in a loading dock, a front frame section mounted in the pit and spaced forwardly of the rear frame section, each frame section including a base member, a leveling member mounted for free vertical movement with respect to the base member of each frame section, each leveling member having a lower section disposed beneath the base member and having an upper section spaced above said lower section, engagement of said upper section with the base member limiting downward movement of said leveling member with respect to said base member, the lower sections of said leveling members adapted to engage the bottom of a pit in a loading dock as the dockboard is installed therein and adapted to move vertically relative to the respective base members as the dockboard is leveled, said leveling members thereafter being secured to said frame sections to maintain the dockboard in the leveled condition.

3. The frame construction of claim 2, wherein each frame section includes a support extending upwardly from each base member, engagement of a side edge of each leveling member with the respective support preventing displacement of said leveling member with respect to said base member in a longitudinal direction of said base member.

4. The frame construction or claim 2, wherein at least one of said frame sections includes a vertical support extending upwardly from the base section, the upper section of said leveling member having a slot to slidably receive said vertical support, engagement of said support with said slot preventing displacement of the leveling member in a direction longitudinally of said base member.

5. In combination, a loading dock having a pit in the upper surface thereof, said pit having a generally horizontal bottom surface, a dockboard disposed in the pit, said dockboard including a rear frame section and a front frame section spaced forwardly of the rear frame section, said dockboard including a ramp hinged to the rear frame section and movable between a generally horizontal cross traffic position and an upwardly inclined position, each of said frame sections including a base member, a pair of leveling members associated with each frame section, each leveling member including a lower horizontal section disposed between the base member and the bottom surface of the pit and having an upper section disposed in spaced relation to the lower section and located above said base member, and connecting means for connecting each leveling member to the respective frame section to support the dockboard in a level condition.

6. The combination of claim 5, wherein at least one of said frame sections includes a vertical support extending upwardly from the base section, the upper section of said leveling member having a slot to slidably receive said vertical support, engagement of said support with said slot preventing displacement of the leveling member in a direction longitudinally of said base member.

7. The combination of claim 5, wherein at least one of said frame sections includes a pair of spaced vertical supports, the upper section of said leveling member being disposed between said vertical supports to prevent displacement of the leveling member in a direction longitudinal of said base member.

8. The combination of claim 5 wherein said connecting means constitutes weld means.

* * * * *